US008789285B2

United States Patent
Wada et al.

(10) Patent No.: US 8,789,285 B2
(45) Date of Patent: Jul. 29, 2014

(54) LENS ASSEMBLING METHOD, LENS ASSEMBLY, AND IMAGE CAPTURING DEVICE WITH THE LENS ASSEMBLY

(75) Inventors: Kazuhiro Wada, Hachioji (JP); Katsuki Furuta, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 315 days.

(21) Appl. No.: 13/498,520

(22) PCT Filed: Aug. 17, 2010

(86) PCT No.: PCT/JP2010/063861
§ 371 (c)(1),
(2), (4) Date: Mar. 27, 2012

(87) PCT Pub. No.: WO2011/040136
PCT Pub. Date: Apr. 7, 2011

(65) Prior Publication Data
US 2012/0182459 A1    Jul. 19, 2012

(30) Foreign Application Priority Data

Sep. 30, 2009  (JP) ................................. 2009-226168

(51) Int. Cl.
*G02B 13/00* (2006.01)
(52) U.S. Cl.
USPC ............................................. 33/613; 33/645
(58) Field of Classification Search
CPC ...... G02B 7/022; G02B 13/00; G02B 13/003; G02B 13/0085; G02B 27/32; G02B 3/0056; G02B 3/0068; G02B 7/023; G02B 3/08; G02B 6/34; G02B 6/4204; G02B 6/4246; G02B 6/4292; G02B 7/003; G02B 7/028; G02B 13/0025; G02B 13/006; G02B 13/18; G02B 21/02; G02B 21/33; G02B 7/02
USPC ...................................................... 33/613, 645
See application file for complete search history.

(56) References Cited

U.S. PATENT DOCUMENTS

| 6,710,947 B1 * | 3/2004 | Momot et al. ................. 359/819 |
| 6,919,996 B2 * | 7/2005 | Wada et al. .................... 359/719 |
| 7,133,223 B2 * | 11/2006 | Wada et al. .................... 359/811 |
| 7,301,713 B2 * | 11/2007 | Yamamoto et al. ........... 359/820 |
| 7,468,849 B2 * | 12/2008 | Yamamoto et al. ........... 359/811 |
| 2004/0032671 A1 * | 2/2004 | Wada et al. .................... 359/819 |

(Continued)

FOREIGN PATENT DOCUMENTS

| JP | 2006-268015 | 10/2006 |
| JP | 2007-079318 | 3/2007 |
| JP | 2007-519020 | 7/2007 |

*Primary Examiner* — Yaritza Guadalupe-McCall
(74) *Attorney, Agent, or Firm* — Cozen O'Connor

(57) ABSTRACT

A lens assembling method for assembling a first lens and a second lens where the first lens has a first mark on a first surface thereof and a second mark on a second surface opposite to the first surface, and the second lens has a third mark on a first surface thereof, the lens assembling method including: a first step of aligning a position of one of the first mark and second marks of the first lens with a position of the third mark of the second lens; and a second step of aligning a position of the other one of the first and second marks of the first lens with the position of the third mark of the second lens, while keeping the position alignment performed in the first step.

19 Claims, 14 Drawing Sheets

(56) References Cited

U.S. PATENT DOCUMENTS

| | | | |
|---|---|---|---|
| 2005/0094294 A1* | 5/2005 | Wada et al. | 359/811 |
| 2006/0056074 A1* | 3/2006 | Yamamoto et al. | 359/796 |
| 2008/0094737 A1* | 4/2008 | Yamamoto et al. | 359/822 |
| 2008/0253002 A1* | 10/2008 | Yamamoto et al. | 359/820 |
| 2011/0075013 A1* | 3/2011 | Chang | 348/335 |
| 2012/0069294 A1 | 3/2012 | Ohno et al. | |
| 2012/0182459 A1* | 7/2012 | Wada | 348/340 |
| 2012/0188634 A1* | 7/2012 | Kubala et al. | 359/356 |

* cited by examiner

LENS ASSEMBLING METHOD, LENS ASSEMBLY, AND IMAGE CAPTURING DEVICE WITH THE LENS ASSEMBLY

This is a U.S. National Phase Application under 35 USC 371 of International Application PCT/JP2010/063861 filed on Aug. 17, 2010.

This application claims the priority of Japanese Application No. 2009-226168 filed Sep. 30, 2009, the entire content of which is hereby incorporated by reference.

TECHNICAL FIELD

The present invention relates to a lens assembling method for assembling a plurality of lenses to be provided in an optical device, an assembly assembled with the plurality of lenses, and an image capturing device provided with the lens assembly.

BACKGROUND TECHNOLOGY

Usually an optical system such as a digital camera and a mobile phone with camera is structured with a combination of the plurality of lenses. In cases of assembling these optical systems, by precisely matching optical axes of the plurality of lenses with each other, structuring the lens assembly by fixing between the lenses in matched state, after that, the image capturing device is structured by arranging an image capturing sensor on the lens assembly. In this case, the optical system with displaced optical axes causes the problems of image distortion, blurred image and the like, which cannot cause a good imaging performance. For example, with respect to a camera lens unit including the plurality of lenses it is required to assemble the plurality of lenses in high precision, as image sensors being developed to be higher density of pixels, and the assembling process is becoming difficult. For example, in the work of assembling the plurality of lenses, an axis aligning work to match the axis of each of the lenses is included, and to precisely match each axis of the lenses by the aligning work is a work of very high difficulty level. As the method of assembling the plurality of lenses, there are mainly four types of assembling methods as shown below. Said four types of assembling methods will be described referring to FIGS. 14a-14d, which are section views of the lens showing the assembling methods relating to the conventional methods.

A first method is a lens frame fitting assembling method. This is a method of, as shown in FIG. 14a, tucking the side surfaces of first lens 500 and second lens 51 in lens frame 520, and assembling by physically positioning the two lenses at the reference position of lens frame 520. Since the positioning is executed by lens frame 520, the two lenses can be easily assembled without executing the aligning work to match the light axes of first lens 500 and second lens 510. However, since the positioning of two lenses is conducted by the use of separate other part such as lens frame 520, the problem of inferior positioning precision is caused.

A second method is a reference position fitting assembling method. In this method, as shown in FIG. 14b, flange 531 is provided in outer circumferential area outside of an effective optical surface of the first lens 530. Similarly, flange 541 is provided in outer circumferential area outside of an effective optical surface of the second lens 540. Then, by fitting the first lens 530 and the second lens 540, flanges 531 and 541 function as reference positions and the physical positioning of the two lenses is performed to enable the assembling of the two lenses. According to the second method, since the positioning of the two lenses is physically executed with flanges (reference position), high precision assembling can be easily performed without executing the aligning work to align the light axes. Since the flanges function as the reference positions, the positions of the flanges need to be precisely provided on each lens, however high precision formation of the flanges is very difficult. Namely, producing the lens having high precision reference position is a work of high difficulty level. Further, conducting the assembling work with measuring the reference position (flange position) is also very difficult.

As a third method, there is a method of assembling lenses while aligning the light axes by measuring the optical performance of the lenses. For example, as shown in FIG. 14c, by providing the first lens 550 on the second lens 560 to form a lens assemble, the aligning is performed by moving the first lens 550 in parallel direction (arrow direction) while measuring the optical performance of the lens assembly. Then, by determining the position where optical performance of the lens assembly becomes good, the first lens 550 and the second lens 560 are fixed. According to this assembling method, although the assembling can be performed with high precision, a problem is caused that long time is required for the axes aligning work including the measuring of the optical performance. Further, this assembling method is only applicable to the case of assembling the lens assembly that can be measured of optical performance, which causes a problem of lacking versatility. For example, in the case of assembling a lens unit having plural lenses, since this method can be utilized only for the case of assembling the last lens, this method lacks versatility.

As a forth method, there is a method of assembling lenses while aligning the light axes by utilizing the mark formed on the lens. For example, as shown in FIG. 14d, by providing mark 571 on the first lens 570 at the surface facing to the second lens 580, and providing mark 581 on the second lens 580 at the surface facing to the first lens 570, reading the mark position of each lens, and matching the position of mark 571 with the position of mark 581 by moving the first lens 570 in parallel direction (arrow direction), the axis aligning of the first lens and the second lens is executed. By utilizing the marks in this way, the axis aligning can be easily executed, however since this alignment is only for the parallel direction, to precisely align the light axis is difficult.

Namely, since the alignment is only for the parallel direction, tilt is generated between the first lens 570 and the second lens 571. According to the conventional method, the alignment is performed only in the parallel direction, and the tilt cannot be adjusted. With respect to the tilt, explanation will be done by referring to FIG. 15. FIG. 15 is a section view of a lens assembly relating to the conventional technology. According to the above described forth method, since the adjustment is done only for the parallel direction of the lens, the tilt of axis having tilt angle $\phi$ is generated between the first lens 570 and the second lens 580, and this angle $\phi$ cannot be adjusted. According to the method of conventional technology, for example, the tilted axis of 5-10 arc minutes (5'-10') is generated, which cannot satisfy the tilt angle required for an optical system of 12 million pixels class, for example.

Further, a method of assembling lenses by forming a mark at an outer peripheral area outside the effective optical surface of lens and utilizing the mark is known (for example, Patent Document 1). A method of assembling lenses by utilizing a deficiency existing at a prescribed position in the effective optical surface of the lens as a mark for positioning is known (for example, Patent Document 2). Further, a method of executing the lens alignment by forming a mark on the lens is known (for example, Patent Document 3).

PRIOR ART DOCUMENT

Patent Document

Patent Document 1: Unexamined Japanese Patent Application Publication No. 2002-71909
Patent Document 2: Unexamined Japanese Patent Application Publication No. 2006-268015
Patent Document 3: Japanese Translation of PCT International Application Publication: No. 2007-519020

SUMMARY OF THE INVENTION

Problems to be Solved by the Invention

However, according to the assembling method relating to the conventional technology, it is difficult to adjust the tilt between plural lenses, and the tilt angle required for an optical system of large amount of pixels cannot be satisfied. For example, in the assembling method described in Patent Document 1, it is difficult to perform the alignment including the adjustment of the tilt between plural lenses. Further, since the lenses described in Patent Document 2 and 3 are aiming at an improvement of precision in eccentricity with respect to a lens itself, it is difficult to adjust the tilt between plural lenses.

The present invention is for solving the abovementioned problems, and aiming to provide a lens assembling method capable of assemble plural lenses, in case of assembling the plural lenses, by adjusting the tilt between the plural lenses. The present invention further aims to provide a lens assembly assembled and adjusted with the tilt between the plural lenses, and to provide an image capturing device including the lens assembly.

Means for Solving the Problems

A first embodiment of the present invention is a lens assembling method for assembling a first lens and a second lens where the first lens has a first mark on a first surface thereof and a second mark on a second surface opposite to the first surface, and the second lens has a third mark on a first surface thereof, the lens assembling method including:
a first step of aligning a position of one of the first mark and second marks of the first lens with a position of the third mark of the second lens; and
a second step of aligning a position of the other one of the first and second marks of the first lens with the position of the third mark of the second lens, while keeping the position alignment performed in the first step.

The second embodiment is the lens assembling method relating to the first embodiment, wherein the second mark of the first lens and the third mark of the second lens are provided so as to face each other, and
in the first step, the position of the second mark is aligned with the position of the third mark.

A third embodiment of the present invention is a lens assembling method for assembling a first lens and a second lens where the first lens has a first mark on a first surface thereof and a second mark on a second surface opposite to the first surface, and the second lens has a third mark on a first surface thereof, the lens assembling method including:
a first step of aligning a position of one of the first mark and second marks of the first lens with a position of the third mark of the second lens; and
a second step of aligning a position of the other one of the first and second marks of the first lens with the position of the third mark of the second lens, while keeping the position alignment performed in the first step,
wherein at least one of the first step and the second step is a step of extrapolating a first virtual mark or a second virtual mark respectively based on the first mark or the second mark, and aligning a position of the first virtual mark or the second virtual mark with the position of the third mark.

The fourth embodiment is the lens assembling method relating to the third embodiment, wherein at least one of the first mark and the second mark comprises multiple marks provided in an outer peripheral area on a periphery of effective optical surface of the first lens, wherein
in the first step or the second step, with respect to the multiple marks, a position of the virtual mark is extrapolated based on the multiple marks provided in the outer peripheral area, and the position of the virtual mark is aligned with the position of the third mark.

The fifth embodiment is the lens assembling method relating to the fourth embodiment, wherein the multiple marks, provided in the outer peripheral area, of the first or the second mark, are respectively provided at a same distance from an optical axis of the first lens, wherein
in the first step or the second step, with respect to the multiple marks provided in the outer peripheral area, a weighted center position of an area enclosed by the multiple marks is extrapolated as the virtual mark, and the position of the virtual mark is aligned with the position of the third mark.

The sixth embodiment is the lens assembling method relating to the fourth or fifth embodiment, wherein positions of the multiple marks of the first mark provided in the outer peripheral area, and positions of the multiple marks of the second mark provided in the outer peripheral area are arranged to be dislocated from each other.

The seventh embodiment is the lens assembling method relating to the third embodiment, wherein at least one of the that mark and the second mark is a circular mark centered with an optical axis of the first lens, provided in an outer peripheral area on a periphery of effective optical surface of the first lens, wherein
in the first step or the second step, with respect to the mark provided in the outer peripheral area, a weighted center position of an area enclosed by the circular mark is extrapolated as the virtual mark, and the extrapolated position of the virtual mark is aligned with the position of the third mark.

The eighth embodiment is the lens assembling method relating to the seventh embodiment, wherein the circular mark of the first mark provided in the outer peripheral area and the circular mark of the second mark provided in the outer peripheral area have different diameters from each other.

The ninth embodiment is the lens assembling method relating to any of the first to second, or seventh embodiment, wherein the first or second mark which is provided in the effective optical surface of the first lens, is provided on the light axis of the first lens.

The tenth embodiment is the lens assembling method relating to any of the first to ninth embodiments, wherein the third mark is provided on the light axis of the second lens.

The eleventh embodiment is the lens assembling method relating to any of the first to ninth embodiments, wherein the third mark comprises multiple marks provided in an outer peripheral area on a periphery of effective optical surface of the second lens, wherein
in the first step or the second step, a positions of a virtual mark, with respect to the third mark, is extrapolated based on the multiple marks of the third mark provided in the outer peripheral area, and the position aligning is executed using the position of the virtual mark as the position of the third mark.

The twelfth embodiment is the lens assembling method relating to the eleventh embodiment, wherein the multiple marks of the third mark are respectively arranged at positions of same distance from an optical axis of the second lens, wherein in the first step or the second step, a weighted center position of an area enclosed by the multiple marks of the third mark is extrapolated as a position of a virtual mark of the third mark, and the position aligning is executed using the position of the virtual mark as the position of the third mark.

The thirteenth embodiment is the lens assembling method relating to any of the first to ninth embodiments, wherein the third mark is, a circular mark centered with an optical axis of the second lens, provided in an outer peripheral area on an periphery of an effective optical surface of the second lens, wherein in the first step or the second step, a weighted center position of an area enclosed by the circular mark of the third mark is extrapolated as a position of a virtual mark of the third mark, and the position aligning is executed using the position of the virtual mark as the position of the third mark.

The fourteenth embodiment is the lens assembling method relating to the first or second embodiment, wherein the first mark and the second mark are respectively provided on an optical axis of the first lens, and the third mark is provided on an optical axis of the second lens.

The fifteenth embodiment is the lens assembling method relating to any of the first to fourteenth embodiments, wherein sizes of the first mark, second mark and the third mark are respectively different from each other.

The sixteenth embodiment is a lens assembly including: a first lens provided with a first mark on a first surface thereof, and a second mark on a second surface opposite to the first surface; and a second lens provided with a third mark, wherein the lens assembly is assembled in conditions that a position of the second mark and a position of the third mark are aligned to be matched with each other, and a position of the first mark and the position of the third mark are aligned to be matched with each other.

The seventeenth embodiment is the lens assembly relating to the sixteenth embodiment, wherein the second lens is provided with a fourth mark on an opposite side surface to the surface formed with the third mark.

The eighteenth embodiment an image capturing device including:

the lens assembly described in claim 16 or claim 17; and an image capturing sensor, which receives incident light having passed through the first and second lenses, provided at an opposite surface side, with respect to the second lens, to a surface side where the first lens is arranged.

Effect of the Invention

According to the present invention, in the first step, the position alignment of the first lens and the second lens can be performed in parallel direction and, further in the second step, the adjustment of the tilt between the lenses is enabled. In this way, the tilt between lenses can be suppressed by the second step, as the result, production of a high precision lens unit is enabled.

PREFERRED EMBODIMENT OF THE INVENTION

In the embodiment of the present invention, a plurality of lenses is assembled, with respect to the lenses provided with marks, by performing an axis alignment based on the marks. For example, in case of assembling two lenses, marks are formed on both sides of at least one lens, and a mark is formed on one side of the another lens. Then, by performing the axis alignment by using these marks, the lenses are assembled. By assembling the lenses with using these marks, lens positioning in a parallel direction is conducted, and a tilt between the lenses is further adjusted. A specific embodiment will be described below.

First Embodiment

Figure 1A:
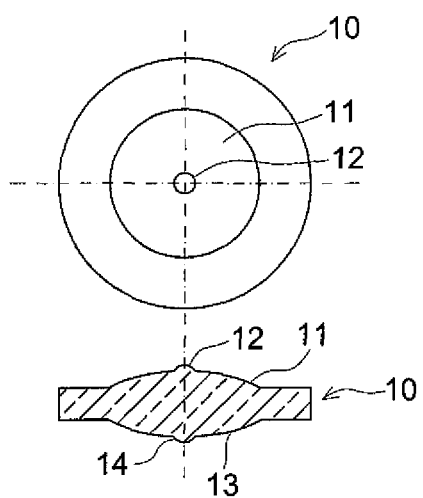
FIGS. 1a-1c show a top view and section a view of a lens relating to a first embodiment of the present invention.
Figure 1B:
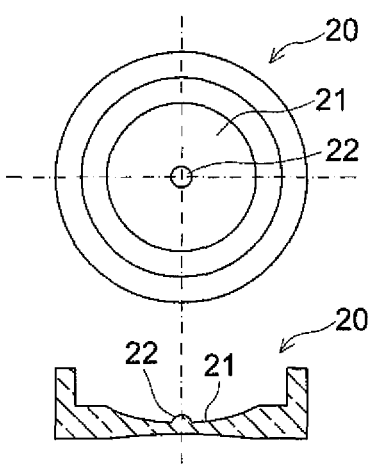
Figure 1C:
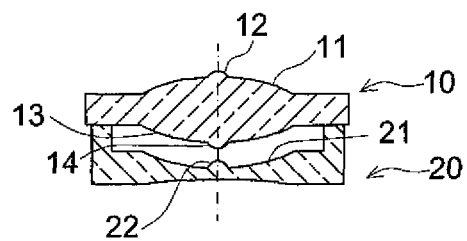
Figure 2A:
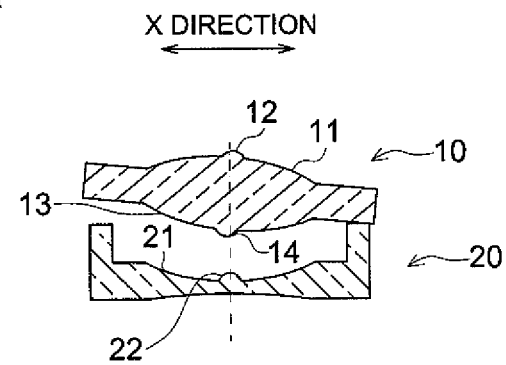
FIGS. 2a-2c show lens section views illustrating an assembling method of the lens relating to the first embodiment of the present invention.
Figure 2B:
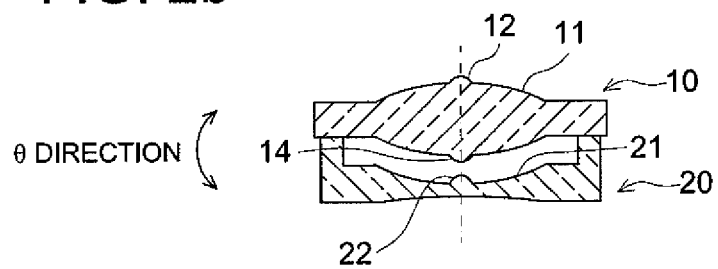
Figure 2C:
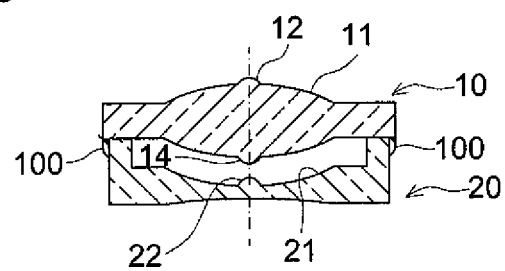

The lens and lens assembling method relating to the first embodiment of the present invention will be described referring to FIGS. 1a-2c. FIGS. 1a-1c show a top view and section a view of a lens relating to the first embodiment of the present invention. FIGS. 2a-2c show lens section views illustrating an assembling method of the lens relating to the first embodiment of the present invention. FIG. 1a shows a top view of a first lens 10 viewed from a side of one surface (first surface 11), and a section view of the first lens 10 taken on a line passing a center of the first lens 10. FIG. 1b shows a top view of a second lens 20 viewed from a side of one surface (first surface 21), and a section view of the second lens 20 taken on a center of the second lens 20. FIG. 1c shows a section view of a lens assembly illustrating the assembled state of the first lens 10 and the second lens 20.

As shown in FIGS. 1a-1c, the lens assembly relating to the first embodiment is provided with the first lens 10 and the second lens 20. The first lens has marks on both sides. For example, as shown in FIG. 1a, with respect to the first lens 10, on one side surface (the first surface 11) at an optical axis of the lens, a first mark 12 shaped convex is provided, and on the other side surface (the second surface 13), a second mark 14 shaped convex is provided. Further, as shown in FIG. 1b, with respect to the second lens 20, on one side surface (the first surface 21) at an optical axis of the lens, a third mark 12 shaped convex is provided. In this embodiment, on the second lens 20 at the optical axis on a surface (the first surface 21) facing to the first lens 10, the third mark 22 is provided. The first mark 12, the second mark 14, and the third mark 22 have circular shapes view from the above direction as an example. Then, as shown in FIG. 1c, by assembling the first lens 10 and the second lens 20 so as to make the second surface 13 of the first lens face the first surface 21 of the second lens 20, the lens assembly is formed.

As an example, each diameter of the first lens 10 and the second lens 20 is 3 mm, and a diameter of the first mark 12 or the like is not greater than 50 µm. For example the diameter of the first lens 10 is 20 µm. The above sizes of the lens and the mark are only examples, and the lens and the mark of the present invention are not restricted to these sizes.

Although not illustrated in the drawings here, the image capturing device is configured such that an image capturing sensor, to receive the incident light passed through the first lens 10 and the second lens 20, is arranged with a prescribed interval at the opposite surface side to the first surface 21 of the second lens 20.

Shapes of first mark 12, the second mark 14, and the third mark 22 may be round in section view as shown in FIG. 1, or may be rectangular. Further shapes of the first mark 12, the second mark 14, and the third mark 22 may be convex shapes or may be concave shapes as grooves. Further sizes of the first mark 12, the second mark 14, and the third mark 22 may be the same or may be different from each other.

The first lens 10 and the second lens 20 may be made of resin or may be made of glass.

(Lens Assembling Method)

Next, the assembling method of the first lens 10 and the second lens 20 will be described referring to FIG. 2.

(First Process: Shift Alignment)

Firstly, as shown in FIG. 2a, by making the second surface 13 of the first lens face to the first surface 21 of the second lens 20, disposed is the first lens 10 above the second lens 20. Then matched is the position of the third mark 22 provided on the second lens 20 to the position of the second mark 14 provided on the first lens 10. For example, by moving the first lens 10 in the parallel direction (X direction) above the second lens 20, matched is the position of second mark 14 to the position of the third mark 22.

Specifically, before placing the first lens 10 on the second lens 20, by observing the third mark 22 on the second lens 20 using a microscope, measured is a position of the third mark 22 provided on the second lens 20, for example, by using a three-dimensional coordinate optical measuring machine (hereinafter referred as a coordinate measuring machine). For measuring the three dimensional coordinate, a known coordinate measuring machine can be used. The coordinate measuring machine measures the coordinate of the third mark 22 by assuming, for example, a previously determined position as a point of origin, and retains the coordinate information.

Next, by making the second surface 13 face to the first surface 21 of the second lens 20, the first lens 10 is placed on the second lens 20. Then, a position of the second mark 14 provided on the first lens 10 is measured with the coordinate measuring machine, and the coordinate information of the second mark 14 is retained. Thereafter, based on the retained coordinate information, the first lens 10 is moved in parallel direction (X direction) to match the position of the third mark 22 and the position of the second mark 14 (shift alignment).

And, by matching the position of the second mark 14 provided on the first lens 10 and the position of the third mark 22 provided on the second lens 20, the positions of the first and second lenses are maintained.

(Second Process: Tilt Alignment)

Next, a position of the first mark 12 provided on the first surface 11 of the first lens 10 is measured with the coordinate measuring machine, and the coordinate information of the first mark 12 is retained. Then, with keeping the state that positions of the second mark 14 and the third mark 22 are matched, the tilt of the first lens 10 is changed so as to match the position of the first mark 12 and the position of the third mark 22. For example, as shown in FIG. 2b, with keeping the state that positions of the second mark 14 and the third mark 22 are matched, the tilt of the first lens 10 is changed in θ direction so as to match the position of the first mark 12 and the position of the third mark 22 (tilt alignment).

As described above, by matching the position of the first mark 12 and the position of the third mark 22 with keeping the state that the positions of the second mark 14 and the third mark 22 are matched, the tilt between the first lens 10 and the second lens 20 can be aligned. Namely, according to this second process (tilt alignment), by adjusting the tilt between the optical axis of the first lens 10 and the optical axis of the second lens 20, suppressing of the tilt is enabled.

(Fixing the First Lens 10 and the Second Lens 20)

In the state that the position of the first mark 12 and the position of the third mark 22 are matched, as shown in FIG. 2c, by providing an adhesive 100 on the periphery of first lens 10 and second lens 20, the first lens 10 and the second lens 20 are adhesively fixed.

As described above, according to the first process (shift alignment), matching the position of first lens 10 and the position of second lens 20 is enabled. Further, according to the second process (tilt alignment) the suppression of the tilt of optical axes is enabled by adjusting the tilt between the first lens 10 and the second lens 20.

As described above, according to the lens assembling method relating to the present embodiment, by measuring and aligning the first mark 12, second mark 14 and the third mark 22, a relative tilt (relative tilt amount), which cannot be detected by the conventional method, is enabled to be measured and aligned. Accordingly, it is enabled to suppress the relative tilt between lenses and to easily produce a high precision lens unit.

Figure 15:
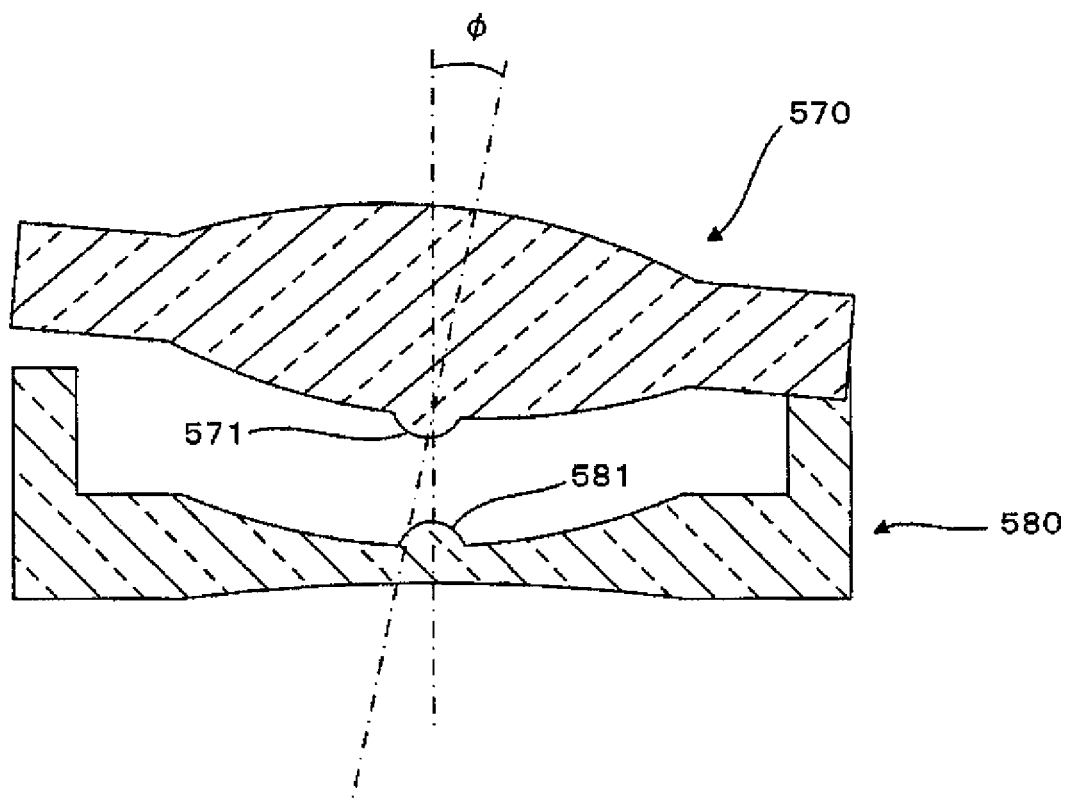
FIG. 15 shows a section view of a lens assembly relating to the conventional method.

For example in the conventional technology shown in FIG. 15, tilts of 5' (5 arc-minutes) to 10' between lenses are generated. In contrast, according to the assembling method relating to the present embodiment, it is enabled to suppress the tilt between the first lens 10 and the second lens to 2' or less. For a high pixel optical system of 12 million pixels class, the tilt between lenses is required to be 3' or less. According to the assembling method relating to the present embodiment, since the tilt between lenses can be suppressed to 2' or less, the tilt amount required for the high pixel optical system can be satisfied.

In the above description, the configuration is explained where the third mark 22 provided on the second lens 20 faces the second mark 14 provided on the first lens 10. This is because visibility of the mark is higher when the mark is nearer, since the positioning is conducted by viewing the mark through the first lens 10. However, the present invention is not restricted to this. Namely the third mark 22 provided on the second lens 20 may be located on an opposite surface to the surface facing to the mark provided on the first lens 10, and the shift alignment may be performed between the marks that do not face with each other.

(Other Examples of the Mark)

Figure 3:
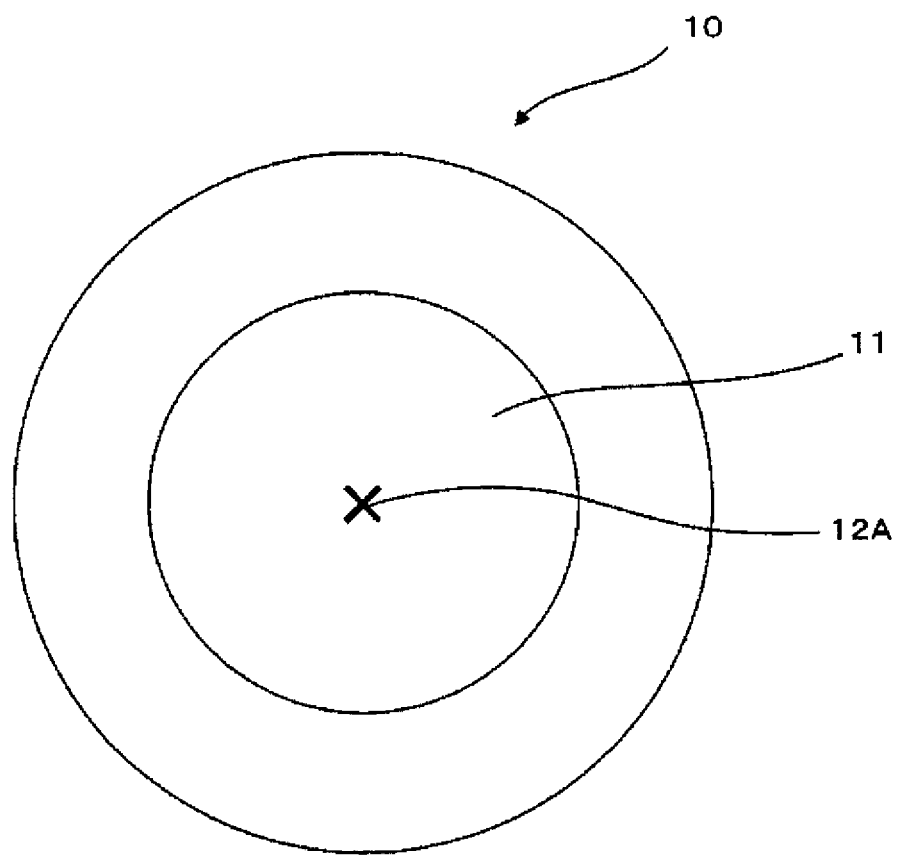
FIG. 3 is a top view illustrating the other example of mark.

The other example of the marks provided on the first lens 10 and the second lens 20 is shown in FIG. 3. FIG. 3 is a top view showing another example of the mark. For example the first mark 12A is X shaped when viewing from above. Namely the first mark 12A has a shape of crossed two line segments. Like this, the figure of the marks provided on the first lens 10 and the second lens 20 may be X shaped.

The X shaped mark may be convex mark or concave mark having a grooved shape. Each of the marks provided on the first lens 10 and the second lens 20 may have a same figure or different figure with each other. Further said each mark may have a same size or respective different size.

Further, the size and figure of each mark is preferably varied with each other. By this, since each mark can be easily identified and detected, easy lens assembly is enabled.

Further, from the view point that the metal mold for molding the first lens 10 and the second lens 20 is manufactured by processing the material while rotating it, each mark is preferably has a rounded figure.

Variant Example 1

Figure 4A:
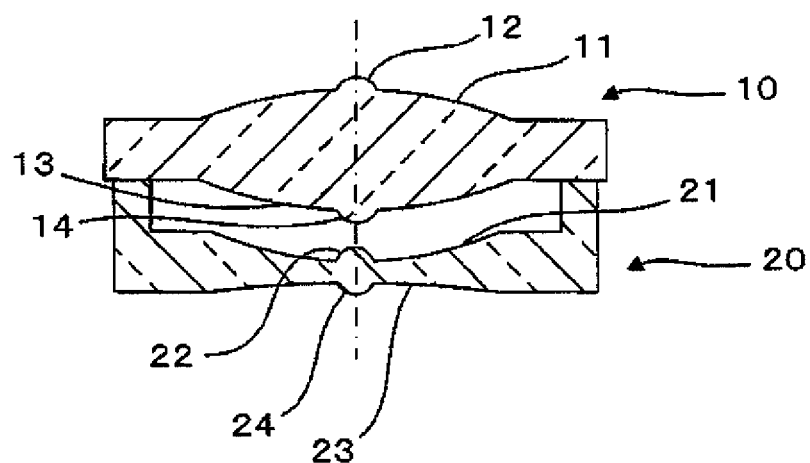
FIGS. 4a-4b show section views of the lens relating to variant example 1.
Figure 4B:
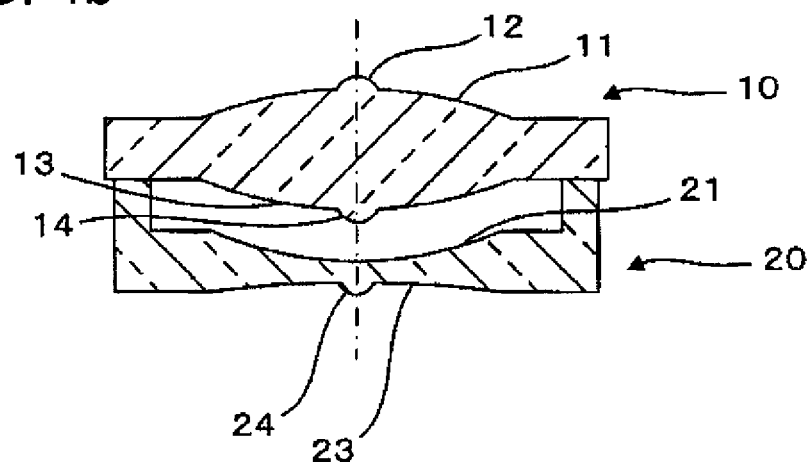

Next, the lens relating to variant example 1 is described referring to FIGS. 4a and 4b. FIGS. 4a-4b show section views of the lens relating to variant example 1. Although, in the above described first embodiment, marks are provided on both surfaces of the first lens 10 and another mark is provided on one side surface of the second lens 20, marks may be provided on both sides of each of the lenses. For example, regarding the second lens 20, as shown in FIG. 4a, the third mark 22 is provided at an optical axis of the lens on one side surface (the first surface 21), and the fourth mark 24 is provided at an optical axis of the lens on the other side surface (the second surface 23). In this way, the marks (the first mark 12, the second mark 14) are provided on both surfaces of the first lens 10 and the marks (the third mark 22, the fourth mark 24) are provided on both surfaces of the second lens 20. According to this, the more precise alignment is enabled. The lenses relating to the variant example 1 can be also assembled by the same assembling method of the above described embodiment 1. Namely, according to the first process (shift alignment), the position of first lens 10 and the position of second lens 20 is matched in the parallel direction, further, according to the second process (tilt alignment) the tilt of optical axes between the first lens 10 and the second lens 20 is adjusted. By this assembling method, the relative tilt between the lenses is suppressed and an easy production of a high precision lens unit is enabled.

Namely by providing the marks on both surfaces of the first lens 10, and further providing the marks on both surfaces of the second lens 20, the optical axis of the second lens 20 can be precisely measured, and the optical axes of the first lens 10 and the second lens 20 can be aligned in parallel. Accordingly, production of a higher precision lens unit is enabled than the case of providing the mark on only one side surface of the second lens 20.

Further, as shown in FIG. 4b, in the second lens 20, the fourth mark 24 is provided at the optical axis on the second surface 23, and any mark may not be provided on the first surface. Namely, by the first process (shift alignment), the position of the fourth mark 24 provided on the second lens 20 and the position of the second mark 14 provided on the first lens 10 is matched. Due to this, the position between the first lens 10 and the second lens 20 is aligned in the parallel direction. Further, according to the second process (tilt alignment) the position of the first mark 12 and the fourth mark 24 are matched while keeping the matched state between the position of the second mark 14 and the position of the fourth mark 24. By this, the tilt between the first lens 10 and the second lens 20 is adjusted. By this assembling method, the relative tilt between the lenses is suppressed and an easy production of a high precision lens unit is enabled.

As described above, in this embodiment, by forming marks on both surfaces of at least one lens out of the two lenses, and forming a mark on one side surface of the another lens, the relative tilt between the lenses is suppressed and an easy production of a high precision lens unit is enabled.

Variant Example 2

Figure 5A:
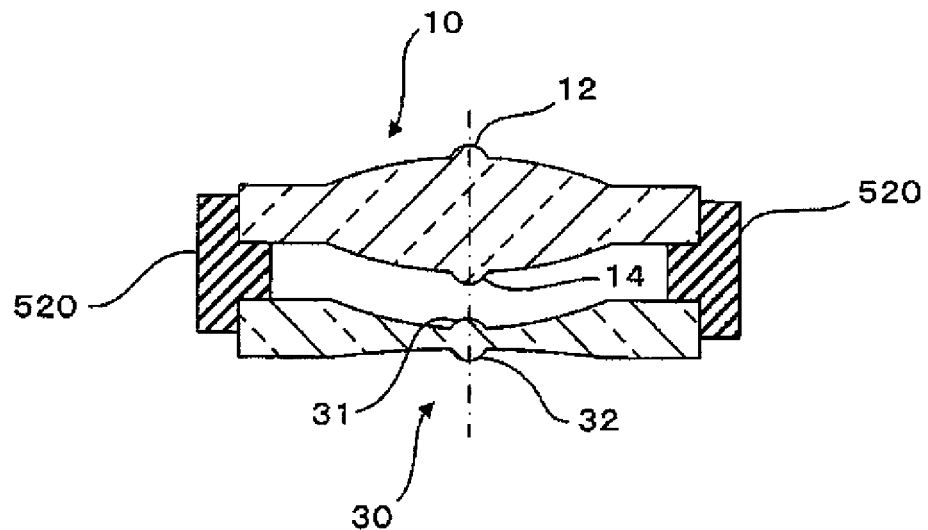
FIGS. 5a-5b show section views of the lens relating to variant example 2.
Figure 5B:
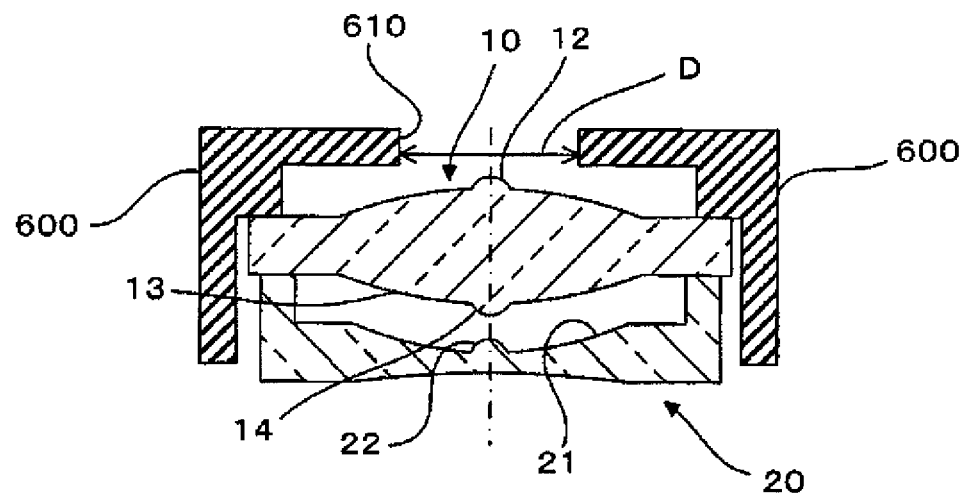

Next, lenses relating to variant example 2 are described referring to FIGS. 5a and 5b. FIGS. 5a-5b show section views of the lenses relating to variant example 2. In case of assembling a plurality of lenses, a lens frame may be used. For example, as shown in FIG. 5a, assembling may be conducted by holding side surfaces of the first lens 10 and the second lens 30 with a lens frame 520 to fix the positions of the first lens 10 and the second lens 30. In the variant example 2, marks are provided on both surfaced of the second lens 30. The first mark 31 is provided at the optical axis on the surface facing the first lens 10. The second mark 32 of the second lens 30 is provided at the optical axis of said lens on the opposite side surface to the first surface. Even in cases of assembling the lenses using the lens frame 520, similarly to the above described first embodiment, assembling is enabled by adjusting the tilt between the first lens 10 and the second lens 30. As the result, suppression of the relative tilt between the lenses is enabled. Further, even in cases where the first lens 10 provided with marks on both surfaces and the second lens 20 provided with the mark on one side surface are assembled, the lens frame 520 may be utilized.

Further, as shown in FIG. 5b, even in cases of assembling a lens unit and a diaphragm 600, the sift alignment and the tilt alignment can be executed by utilizing the two marks (the first mark 12 and the second mark 14) provided on the first lens 10. Namely, by matching the positions of the first mark 12 and the second mark 14 with respect to a center of opening section 610 provided on the diaphragm 600, the shift alignment and the tilt alignment can be executed. As the result, easy production of a high precision lens unit is enabled. Further, even after assembling of the lens unit, a position measurement of the diaphragm 600 and the optical axis of lens unit can be easily executed.

Second Embodiment

Figure 6A:
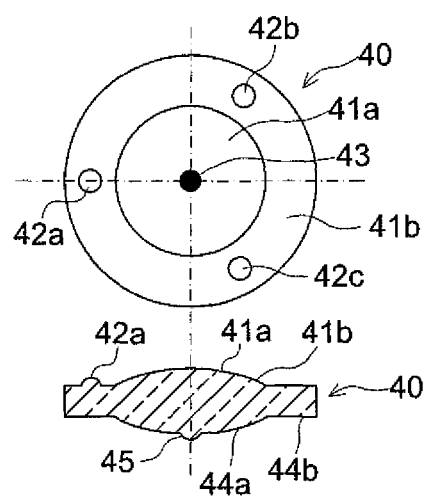
FIGS. 6a-6c show a top view and a section view of a lens relating to a second embodiment of the present invention.
Figure 6B:
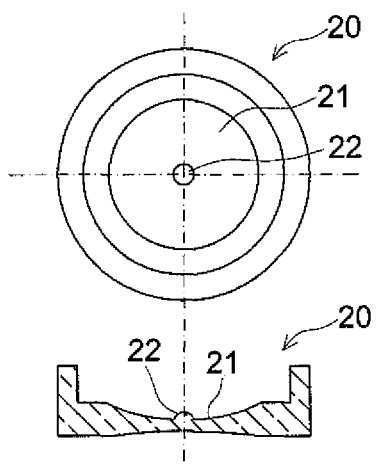
Figure 6C:
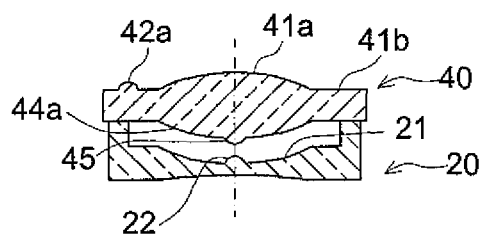

Next, the lens and lens assembling method relating to the second embodiment of the present invention will be described referring to FIGS. 6a-6c. FIGS. 61a-6c show a top view and a section view of a lens relating to the second embodiment of the present invention. FIG. 6a shows a top view of a first lens 40 viewed from a side of one surface (the surface including an effective optical surface 41a), and a section view of the first lens 40 taken on a line passing a center of the first lens 40. FIG. 6b shows a top view of a second lens 20 viewed from a side of one surface (first surface 21), and a section view of the second lens 20 taken on a line passing a center of the second lens 20. FIG. 6c shows a section view of a lens assembly illustrating the assembled state of the first lens 40 and the second lens 20.

In the above described first embodiment, a mark is provided on the optical axis of the lens. On the other hand, in the second embodiment, the mark is provided at the other position than the optical axis. For example, the mark is provided in an outer peripheral area on the periphery of the effective optical surface of the lens.

Specifically, as shown in FIG. 6a, the first lens 40 is provided with marks on both side surfaces. The first surface of the first lens 40 is configured with effective optical surface 41a including the optical axis, and an outer peripheral area 41b existing in a periphery of the effective optical surface 41a. The second surface opposite to the first surface is configured with effective optical surface 44a including the optical axis, and an outer peripheral area 44b existing in a periphery of the effective optical surface 44a. On the outer peripheral area 41b of the first surface, three marks (first marks 42a, 42b, and 42C) are provided by centering the optical axis with respective intervals of the same angle from each other. For example, the first marks 42a, 42b, and 42c are provided by centering the optical axis with respective intervals of 120 degrees, on the outer peripheral area 41b. Further, the first marks 42a, 42b, and 42c are respectively provided at the same distance from the optical axis. Namely, on a same circle centering the optical axis, the first marks 42a, 42b, and 42c (hereinafter may be referred as first mark 42 etc.) are respectively provided. Further, on the second surface, second mark 45 is provided on the optical axis in the effective optical surface 44a. Further, as shown in FIG. 6b, in the second lens 20, third mark 22 is provided on the optical axis in one side surface (first surface 21).

Similarly to the first embodiment, the first mark 42 etc., the second mark 45 and the third mark 22 may have a circular form, or a rectangular form. Further a shape of the first mark 12, the second mark 14, and the third mark 22 may be concave form or convex form as a groove. Further sizes of these marks may be the same or may be different from each other.

Then, as shown in FIG. 6c, by making the second surface (including the effective optical surface 44a) of the first lens and the first surface 21 of the second lens face with each other, and combining the first lens 40 and the second lens 20, the lens assembly is formed.

(Lens Assembling Method)

Next, the method of combining the first lens 40 and the second lens 20 will be described. Firstly, similarly to the first embodiment, by making the second surface (the surface including the effective optical surface 44a) of the first lens 40 face to the first surface 21 of the second lens 20, the first lens 40 is disposed above the second lens 20. Then the position of the third mark 22, provided on the second lens 20, is matched to the position of the second mark 45 provided on the first lens 40. To be more specific, similarly to the first embodiment, by measuring the position of the second mark 45 and the position of the third mark 22 with a coordinate measuring machine, the first lens 40 is moved in parallel direction (shift alignment) so that the position of the third mark 22 and the position of the second mark 45 match with each other, based on coordinate information of each mark. And the positions of the first lens 40 and the position of the second lens 20 are maintained with the condition that the position of the second mark 45 and the position of the third mark 22 are matched.

Next, by measuring with the coordinate measuring machine the positions of the first marks 42a, 42b and 42c, the coordinate information of the first marks 42a, 42b and 42c is retained. Then, based on each coordinate information of the first marks 42a, 42b and 42c, the weighted center position of the area enclosed by the first marks 42a, 42b and 42c is extrapolated. For example, the weighted center position of a triangle formed by the first marks 42a, 42b and 42c is extrapolated. Since the first mark 42a, etc. are provided at an equal distance from the optical axis, the extrapolated weighted center is to be positioned on the optical axis of the first lens 40. That is to say, since the third mark 22 of the second lens 20 is provided on the optical axis, the first mark 42a, etc. are provided in the outer peripheral area 41b of the first lens 40 so that the extrapolated weighted center position is located on the optical axis of the first lens 40. For example, as shown in FIG. 6a, by specifying the weighted center position based on the first mark 42a, etc., the weighted center position is defined as the position of virtual mark 43. Since the weighted center position extrapolated by the first marks 42a, etc. is positioned on the optical axis of the first lens 40, the virtual mark 43 is also positioned on the optical axis of the first lens 40. In the second embodiment, although three marks are provided in the outer peripheral area, four or more marks may be provided in the outer peripheral area to extrapolate the virtual mark.

Said weighted center position is at the same position as the center position of the plane figure.

Then, while keeping the state that the position of the second mark 45 is matched to the position of the third mark 22, changed is the tilt of first lens 40 so that the position of virtual mark 43 on the first lens 40 is matched to the position of the third mark 22 (tilt alignment). In this way, by matching the position of virtual mark 43 and the position of third mark 22 in the state that the position of the second mark 45 is matched to the position of the third mark 22, the tilt between the first lens 40 and the second lens 20 can be aligned. As the result, by adjusting the tilt between the optical axis of first lens 40 and the optical axis of second lens 20, this tilt is enabled to be suppressed.

As described above, even in cases where the mark is formed at a position other than the optical axis, by forming marks on both side surfaces of one lens, a high precision lens unit is enabled to be easily produced with suppressed relative tilt between lenses.

Further, in the first lens 40, the second mark 45 is provided at the optical axis on one side surface (the surface including the effective optical surface 44a), and the first mark 42a is provided in the outer peripheral area 41b other than the optical axis. In this way, by providing the marks at displaced positions on each surface, mark positions on both surfaces are not overlapped with each other, and the position of each mark is enabled to be measured in high precision.

(Another Example of Mark)

Figure 7:
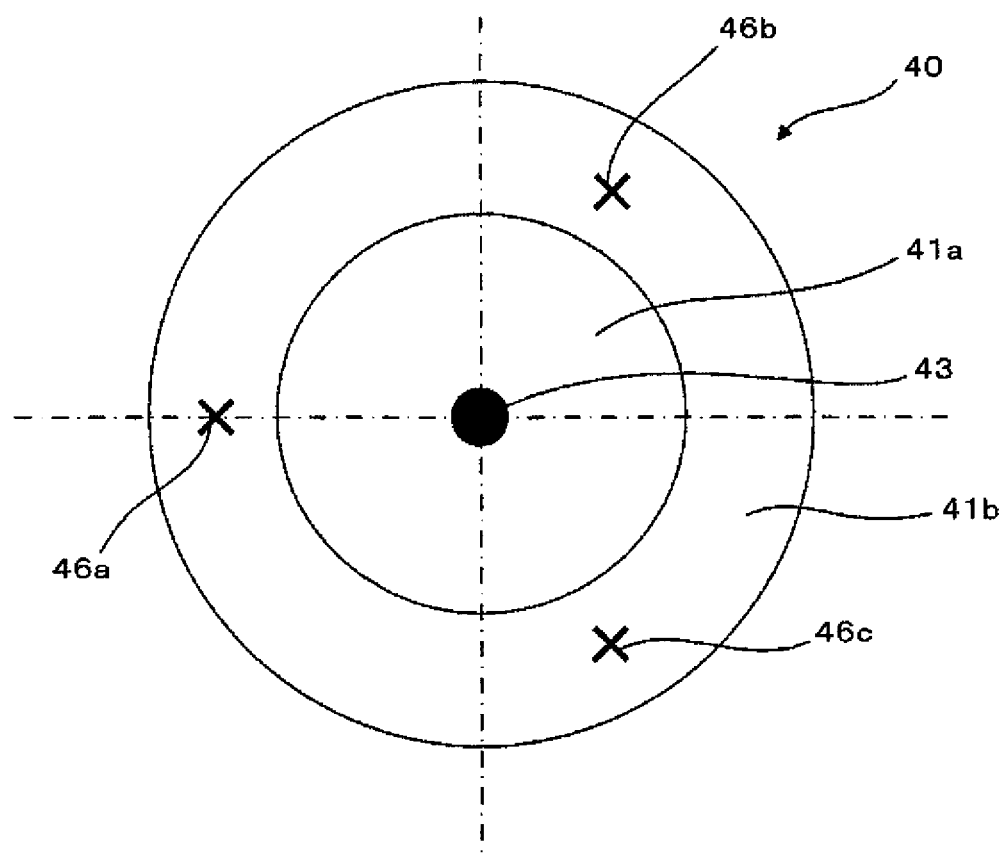
FIG. 7 is a top view illustrating the other example of mark.

Another example of the mark provided on the first lens 40 is shown in FIG. 7. FIG. 7 is a top view illustrating another example of the mark. For example, the first mark 46a, 46b, and 46c has an X shaped figure viewing from above. Namely, the first mark 46a etc. has a figure of crossed two lines. As this, the figure of the mark provided on the outer peripheral area 41b of the first lens 40 may be the X shaped figure. Further, the second mark 45 provided on the first lens 40 may be X shaped, and the third mark 22 provided on the second lens 20 may be X shaped.

Variant Example 3

Figure 8A:
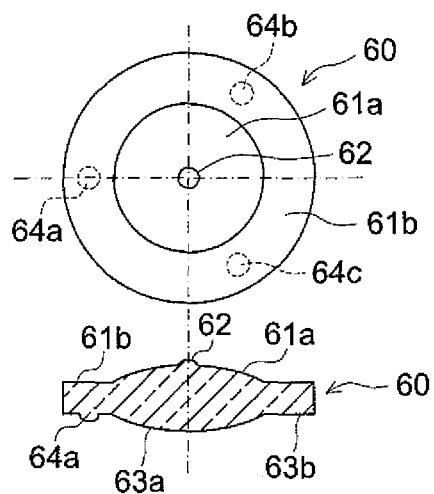
FIGS. 8a-8c show top views and section views of the lens relating to variant example 3.
Figure 8B:
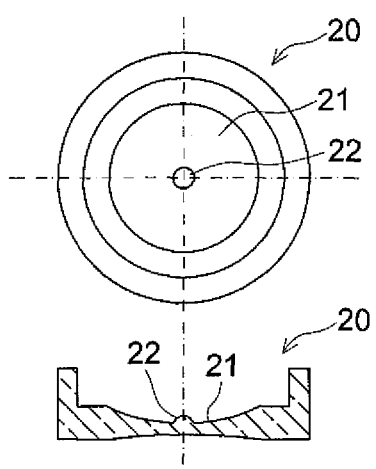
Figure 8C:
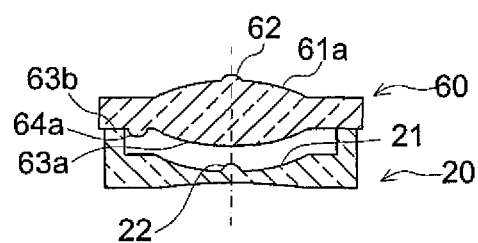

Next, the lens relating to variant example 3 is described referring to FIGS. 8a-8c. FIGS. 8a-8c show top views and section views of the lens relating to variant example 3. In the above described second embodiment, the second mark 45 is provided at the optical axis on the second surface facing to the second lens 20, and the first mark 42a etc. is provided in the peripheral area 41b on the first surface (the surface including the effective optical surface 41a) opposite to the second surface. As this variant example, the first mark may be provided at the optical axis on the first surface of said lens, and a plurality of the second marks may be provided in the outer peripheral area of the second surface.

As shown in FIG. 8a for example, the first surface of the first lens 60 is configured with effective optical surface 61a including an optical axis and outer peripheral area 61b existing in the periphery of the effective optical surface 61a. And, the second surface, which is on opposite side to the first surface, is configured with effective optical surface 63a including an optical axis and outer peripheral area 63b existing in the periphery of the effective optical surface 63a. On the first surface, the first mark 62 is provided at the center of the effective optical surface 61a. On the outer peripheral area 63b of the second surface, three marks (second marks 64a, 64b, and 64c) are provided by centering the optical axis with respective intervals of the same angle from each other. For example, the second marks 64a, 64b, and 64c are provided by centering the optical axis with respective intervals of 120 degrees in the outer peripheral area 63b. Further, the second marks 64a, 64b, and 64c are respectively provided at the same distance from the optical axis. Namely, on a same circle centering the optical axis, the second marks 64a, 64b, and 64c (hereinafter may be referred as second mark 64a etc.) are respectively provided. Further, as shown in FIG. 8b, in the second lens 20, third mark 22 is provided on the optical axis in one side surface (first surface 21).

Then, as shown in FIG. 8c, by making the second surface (including the effective optical surface 63a) of the first lens and the first surface 21 of the second lens face with each other, and combining the first lens 60 and the second lens 20, the lens assembly is formed.

(Lens Assembling Method)

Lenses relating to the third variant example can be assembled similarly to the lenses relating to the second embodiment. First, measuring the position of the third mark 22 provided on the second lens, and the coordinates of the third mark is retained. Then by disposing the first lens 60 above the second lens, and measuring with the coordinate measuring machine the positions of the second marks 64a, 64b and 64c provided in the outer peripheral area 63a of the first lens 60, the coordinates of the second mark 64a, 64b and 64c is retained. Next, based on each piece of coordinate information of the second marks 64a, 64b and 64c, the weighted center position of the area enclosed by the second marks 64a, 64b and 64c is extrapolated. For example, the weighted center position of a triangle formed by the second marks 64a, 64b and 64c is extrapolated. Since the second marks 64a, 64b and 64c are provided at an equal distance from the optical axis, the extrapolated weighted center is to be positioned on the optical axis of the first lens 60. The weighted center position is defined as the position of virtual mark.

Then, the position of the third mark provided on the second lens 20 and the extrapolated position to the virtual mark are matched with each other. To be more specific, the first lens 60 is moved in parallel direction (shift alignment) so that the position of the third mark 22 and the position of the virtual mark match with each other. And the positions of the first lens 60 and the position of the second lens 20 are maintained with the condition that the position of the third mark 22 and the position of the virtual mark are matched.

Next, by measuring the position of the first mark provided on the first surface (the surface including the effective optical surface 61a) of the first lens 60 with the coordinate measuring machine, the coordinate information of the first mark 62 is retained. Then, while keeping the state that the position of the virtual mark is matched to the position of the third mark 22, the tilt of first lens 60 is changed so that the position of the first mark 62 is matched to the position of the third mark 22 (tilt alignment). In this way, by matching the position of first mark 62 and the position of third mark 22 in the state that the position of the virtual mark is matched to the position of the third mark 22, the tilt between the first lens 60 and the second lens 20 can be aligned. As the result, by adjusting the tilt between the optical axis of first lens 60 and the optical axis of second lens 20, said tilt is enabled to be suppressed.

Variant Example 4

Figure 9A:
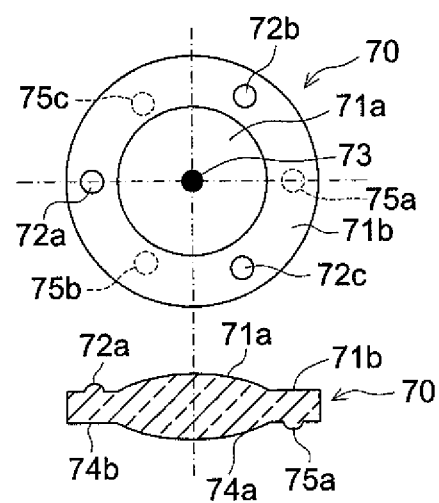
FIGS. 9a-9c show top views and section views of the lens relating to variant example 4.
Figure 9B:
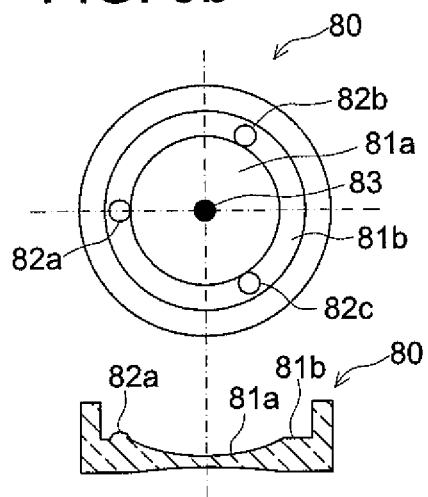
Figure 9C:
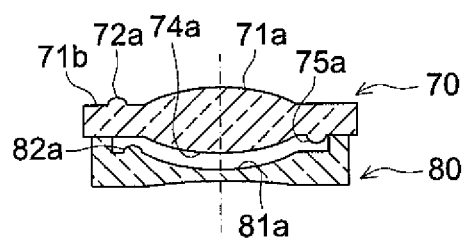

Next, the lens relating to variant example 4 is described referring to FIGS. 9a-9c. FIGS. 9a-9c show top views and section views of the lens relating to variant example 4. In the above described second embodiment and the variant example 3, the mark is provided in the outer peripheral area of the one lens. As a variant example to these, marks may be provided in outer peripheral arias on two lenses.

As shown in FIG. 9a for example, the first surface of the first lens 70 is configured with effective optical surface 71a including an optical axis and outer peripheral area 71b existing in the periphery of the effective optical surface 71a. And, the second surface, which is on opposite side to the first surface, is configured with effective optical surface 74a and outer peripheral area 74b existing in the periphery of the effective optical surface 74a. On the outer peripheral area 71b of the first surface, three marks (first marks 72a, 72b, and 72c) are provided by centering the optical axis with respective intervals of the same angle. For example, the first marks 72a, 72b, and 72c are provided by centering the optical axis with respective intervals of 120 degrees from each other. Further, the first marks 72a, 72b, and 72c are respectively provided at the same distance from the optical axis. Namely, on a same circle centering the optical axis, the first marks 72a, 72b, and 72c (hereinafter may be referred as first marks 72a etc.) are respectively provided, Further, also on the outer peripheral area 74b of the second surface, three marks (second marks 75a, 75b, and 75c) are provided by centering the optical axis with respective intervals of the same angle. For example, the second marks 75a, 75b, and 75c are provided by centering the optical axis with respective intervals of 120 degrees. Further, the second marks 75a, 75b, and 75c are respectively provided at the same distance from the optical axis. Namely, on a same circle centering the optical axis, the second marks 75a, 75b, and 75c (hereinafter may be referred as second marks 75a etc.) are respectively provided.

Wherein, it is preferable to provide the first marks 72a etc., and the second marks 75a etc., on the first lens 70 by relatively displacing the angle with each other. Namely, although each of the first marks 72a etc. and the second marks 75a etc. are respectively provided on the first lens 70 with the interval of 120 degrees, it is preferable to provide the first marks 72a etc., and the second marks 75a etc., with displacing the phase from each other. In this way, by providing the first marks 72a etc., and the second marks 75a etc., with displacing the phase from each other, mark positions on both surfaces are not overlapped with each other, and the position of each mark is enabled to be measured in high precision. Further each of the marks may be provided on the first lens 70 by shifting the diameter of the circle passing through the first marks 72a etc., from the diameter of the circle passing through the second marks 75a etc. For example, by providing the second marks 75a etc., at inside or outside of the first marks 72a etc., the positions of the first marks 72a etc., and the second marks 75a etc., are displaced from each other, and high precision measurement of the position of each mark is enabled.

Further, as shown in FIG. 9b, the first surface of the second lens 80 (the surface opposing to the first lens 70) is configured with effective optical surface 81a including an optical axis and outer peripheral area 81b existing in the periphery of the effective optical surface 81a. In the outer peripheral area 81b in the first surface, three marks (third marks 82a, 82b, and 82c) are provided by centering the optical axis with respective intervals of the same angle. For example, the third marks 82a, 82b, and 82c are provided by centering the optical axis with respective intervals of 120 degrees. Further, the third marks 82a, 82b, and 82c are respectively provided at the same distance from the optical axis. Namely, on a same circle centering the optical axis, the third marks 82a, 82b, and 82c (hereinafter may be referred as third marks 82a etc.) are respectively provided.

Then, as shown in FIG. 9c, by making the second surface (including the effective optical surface 74a) of the first lens 70 and the first surface (including the effective optical surface 81a) of the second lens 80 face with each other, and combining the first lens 70 and the second lens 80, the lens assembly is formed.

(Lens Assembling Method)

Lenses relating to the fourth variant example can be assembled similarly to the lenses relating to the second embodiment. First, measuring with the coordinate measuring machine the position of the third marks 82a, 82b, and 82c provided in the outer peripheral area 81b of the second lens, and the coordinates of the third marks 82a, 82b, and 82c is retained. Next, based on respective coordinate information of the third marks 82a, 82b, and 82c, the weighted center position of the area enclosed by the third marks 82a, 82b, and 82c is extrapolated. For example, the weighted center position of a triangle formed by the third marks 82a, 82b, and 82c is extrapolated. Since the third marks 82a, 82b, and 82c are provided at an equal distance from the optical axis, the extrapolated weighted center is to be positioned on the optical axis of the second lens 60. For example, as shown in FIG. 9b, by specifying the position of the weighted center based on the third marks 82a, etc, the weighted center position is defined as the position of the third virtual mark 83.

Then by disposing the first lens 70 above the second lens 80, and measuring with the coordinate measuring machine the position of the second marks 75a, 75b, and 75c provided in the outer peripheral area 74b of the first lens 70, and the coordinates of the second marks 75a, 75b, and 75c is retained. Next, based on respective coordinate information of the second marks 75a, 75b, and 75c, the weighted center position of the area enclosed by the second marks 75a, 75b, and 75c is extrapolated. For example, the weighted center position of a triangle formed by the second marks 75a, 75b, and 75c is extrapolated. Since the second marks 75a, 75b, and 75c are provided at an equal distance from the optical axis, the extrapolated weighted center is to be positioned on the optical axis of the first lens 70. The weighted center position is defined as the position of the second virtual mark.

Then, the position of the third virtual mark 83 extrapolated in the second lens 80 and the position of the extrapolated second virtual mark in the first lens 70 are matched with each other. To be more specific, the first lens 70 is moved in parallel direction (shift alignment) so that the position of the second virtual mark and the position of the third virtual mark 83 match with each other. And the position of the first lens 70 and the position of the second lens 80 are maintained with the condition that the position of the second virtual mark and the position of the third virtual mark 83 are matched with each other.

Then, by measuring with the coordinate measuring machine the position of the first marks 72a, 72b, and 72c provided on the first surface (the surface including the effective optical surface 71a) of the first lens 70, the coordinate information of the first marks 72a, 72b, and 72c is retained. Next, based on respective coordinate information of the first marks 72a, 72b, and 72c, the weighted center position of the area enclosed by the first marks 72a, 72b, and 72c is extrapolated. For example, the weighted center position of a triangle formed by the first marks 72a, 72b, and 72c is extrapolated. Since the first marks 72a, 72b, and 72c are provided at an equal distance from the optical axis, the extrapolated weighted center is to be positioned on the optical axis of the first lens 70. For example, as shown in FIG. 9a, by specifying the position of the weighted center based on the first marks 72a, etc, the weighted center position is defined as the position of the first virtual mark 73.

Then, while keeping the state that the position of the second virtual mark is matched to the position of the third virtual mark, the tilt of first lens 70 is changed so that the position of the first virtual mark 73 is matched to the position of the third virtual mark 83 (tilt alignment). In this way, by matching the position of the first virtual mark 73 and the position of the third virtual mark 83 in the state that the position of the second virtual mark is matched to the position of the third virtual mark 83, the tilt between the first lens 70 and the second lens 80 can be aligned. As the result, by adjusting the tilt between the optical axis of first lens 70 and the optical axis of second lens 80, said tilt is enabled to be suppressed.

(Another Example of Mark)

Figure 10:
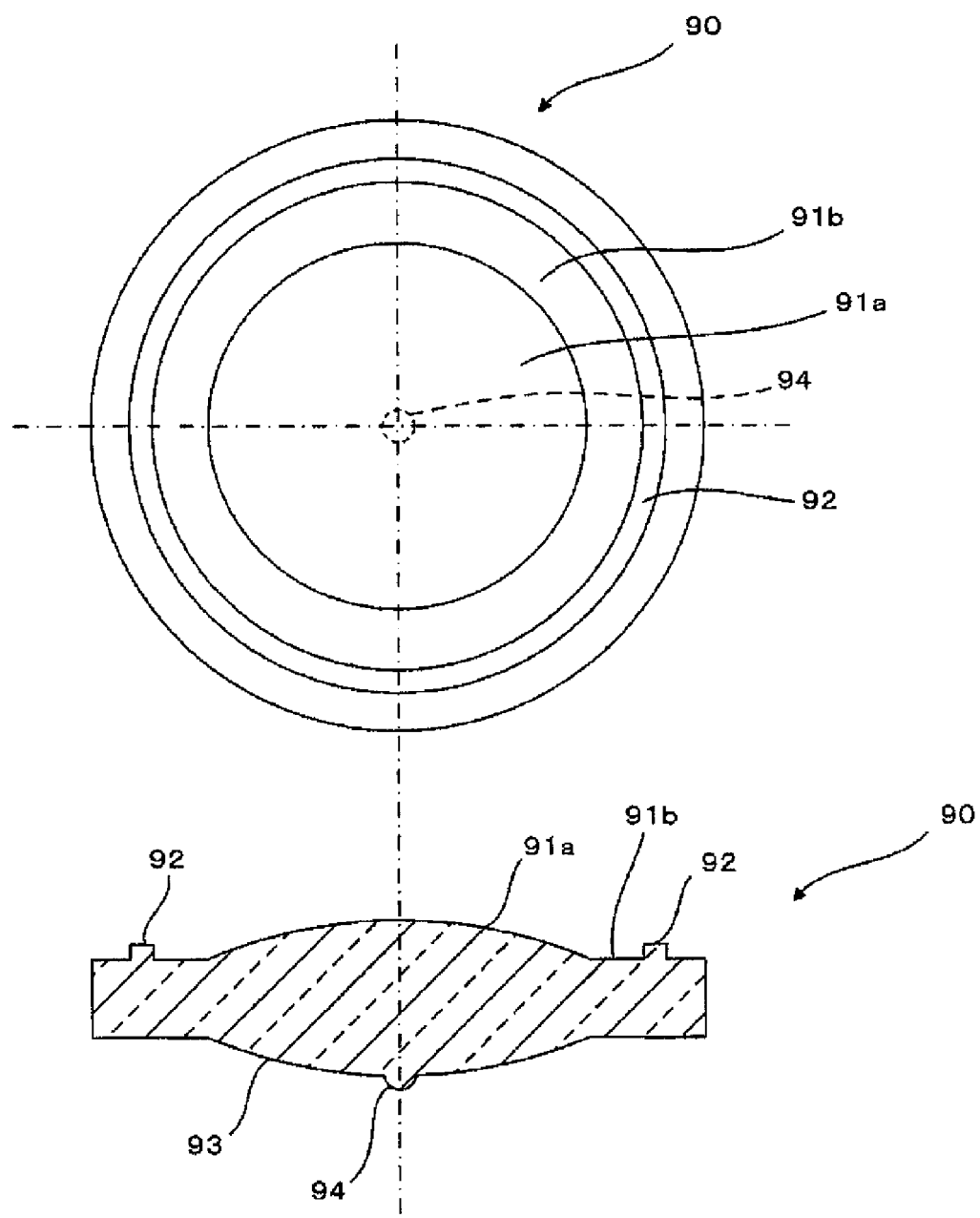
FIG. 10 is a top view and a section view showing the other example of the mark.

Another example of the mark provided on the outer peripheral area of lens is shown in FIG. 10. FIG. 10 is a top view and a section view illustrating another example of the mark. For example, the first surface of the first lens 90 is configured with effective optical surface 91a including an optical axis and outer peripheral area 91b existing in the periphery of the effective optical surface 91a. In this outer peripheral area 91b of the first surface, provided is first mark 92 figured of convex concentric ring centered by an optical axis. Further, on second surface 93 opposite to the first surface, second mark 94 is provided at the optical axis. In the case where the concentric first mark 92 is provided in the outer peripheral area 91b, similarly to the above described second embodiment, the position of the first mark is also measured. Then, by extrapolating the position of the weighted center of the area enclosed by the first mark 92 based on the position of the first mark 92, the extrapolated position of the weighted center is defined as the position of virtual mark. In the example shown in FIG. 10, since the first mark 92 is a circle shaped mark centered by the optical axis, the position of the weighted center coincides with the position of the optical axis. In the case of assembling the fast lens 90 and the second lens (unillustrated), position alignment of the mark is executed with the reference of the extrapolated weighted center position. In this way, even in cases where the figure of mark provided in the outer peripheral area is made to be concentric, the relative tilt between the lenses is suppressed, and a high precision lens unit is enabled to be easily produced.

Although figure of the first mark 92 is rectangle in cross section, the cross section may be figured with curved lines. For example, the cross section of the first mark 92 may be a figure which becomes gradually narrower toward a tip. Further, although the first mark 92 is convex in cross section, a concentric circled groove mark may be provided in the outer peripheral area 91b.

Further, concentric circular marks may be provided in outer peripheral areas on both side surfaces of the first lens 90.

In this case it is preferable to vary the diameter of the concentric circular mark provided on the first surface from the diameter of the concentric circular mark provided on the second surface. By varying each diameter of the concentric circular marks provided on both sides, the mark positions do not overlap on both sides, which enable to measure the position of each mark in high precision. Further, in the second lens to be combined with the first lens 90, the concentric circular mark may be provided in the outer peripheral area of effective optical surface.

Further, from the view point of making a mold for molding lenses, the figure of the mark to be provided in the outer peripheral area of the lens is preferably be concentric circle. Namely, from the view point of processing the mold, forming the mark of concentric circle is easier than forming a plurality of marks to be positioned on a same circle, in the outer peripheral area of the mold.

In cases of forming a lens by resin molding, contraction is larger in the periphery area than in the central area of the lens. Therefore, is more preferable to form the mark on an optical axis of the lens, as the lens relating to the first embodiment, than to form the mark in the outer peripheral area of the lens.

Third Embodiment

Figure 11:
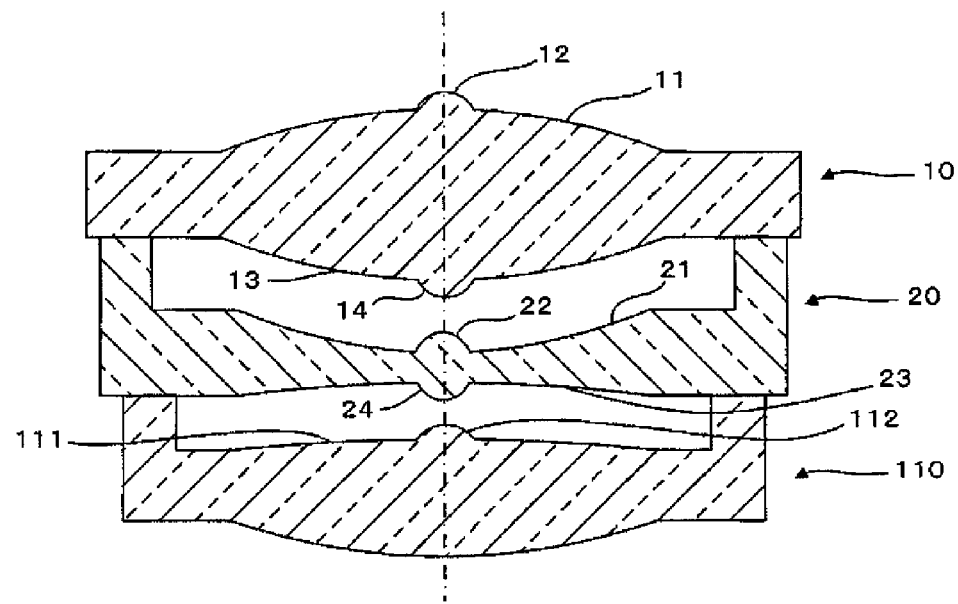
FIG. 11 shows a section view of lenses relating to a third embodiment of the present invention.

Next, lenses relating to the third embodiment of the present invention will be described referring to FIG. 11. FIG. 11 show a section view of the lenses relating to the third embodiment of the present invention. Although in the above described embodiments two lenses are combined, three or more lenses may be combined. For example, even in the case of combining first lens 10, second lens 20 and third lens 30, by repeating the assembling method relating to the above described embodiments, the tilt between the lenses can be suppressed to enable the production of high precision lens unit.

Each of the first lens 10 and the second lens 20 has marks on both surfaces similarly to the lens assembly shown in FIGS. 4*a*-4*b*. In the third lens 110, on the optical axis of the first surface 111 facing to the second lens 20, convex shaped fifth mark 112 is provided.

(Lens Assembling Method)

Assembling method of three lenses will be described. First, measuring with the coordinate measuring machine the position of the fifth mark 112 provided on the third lens 110, and the coordinates of the fifth mark 112 is retained. Next, the second lens 20 is disposed above the third lens 110 by making the second surface 23 of the second lens 20 face to the first surface 111 of the third lens 110. And, by measuring with the coordinate measuring machine the position of the fourth mark 24 provided on the second surface 23 of the second lens 20, the coordinates of fourth mark 24 is retained. Next, based on the retained coordinate information, the second lens 20 is moved in parallel direction so that the position of the fifth mark 112 and the position of the fourth mark 24 match with each other (shift alignment). Then, by matching the position of the fourth mark 24 provided on the second lens 20 with the position of the fifth mark 112 provided on the third lens 110, the position of the second lens 20 and the position of the third lens 110 are maintained with the matched state.

Next, by measuring with the coordinate measuring machine the position of the third mark 22 provided on the first surface 21 of the second lens 20, the coordinates of the third mark 22 is retained. Then, while keeping the state that the position of the fourth mark 24 and the position of the fifth mark 112 are matched, tilt of the second lens 20 is changed so that the position of the third mark 22 and the position of the fifth mark 112 match with each other (tilt alignment). As the result, by adjusting the tilt between the optical axes of second lens 20 and the third lens 110, the tilt is enabled to be suppressed.

Next, the first lens 10 is disposed above the second lens 20 by making the second surface 13 of the first lens 10 face to the first surface 21 of the second lens 20. And, by measuring with the coordinate measuring machine the position of the second mark 14 provided on the second surface 13 of the first lens 10 and the coordinates of second mark 14 is retained. Next, based on the retained coordinate information, the first lens 10 is moved in parallel direction so that the position of the third mark 22 and the position of the second mark 14 match with each other (shift alignment). Then, by matching the position of the second mark 14 provided on the first lens 10 with the position of the third mark 22 provided on the second lens 20, the position of the first lens 10 and the position of the second lens 20 are maintained with the matched state.

Next, by measuring with the coordinate measuring machine the position of the first mark 12 provided on the first surface 11 of the first lens 10, the coordinates of the first mark 12 is retained. Then, while keeping the state that the position of the second mark 14 and the position of the third mark 22 are matched, tilt of the first lens 10 is changed so that the position of the first mark 12 and the position of the third mark 22 match with each other (tilt alignment). As the result, by adjusting the tilt between the optical axes of the first lens 10 and the second lens 20, the tilt is enabled to be suppressed.

As described above, even in the case of assembling three or more lenses, by repeating the shift alignment and the tilt alignment, the tilt between the lenses can be suppressed to enable the production of high precision lens unit.

In the third embodiment, although the mark is provided on the optical axis of each lens, a plurality of marks or a concentric circular mark may be provided in an effective optical surface of each lens for executing the alignment.

Variant Example 5

Figure 12:
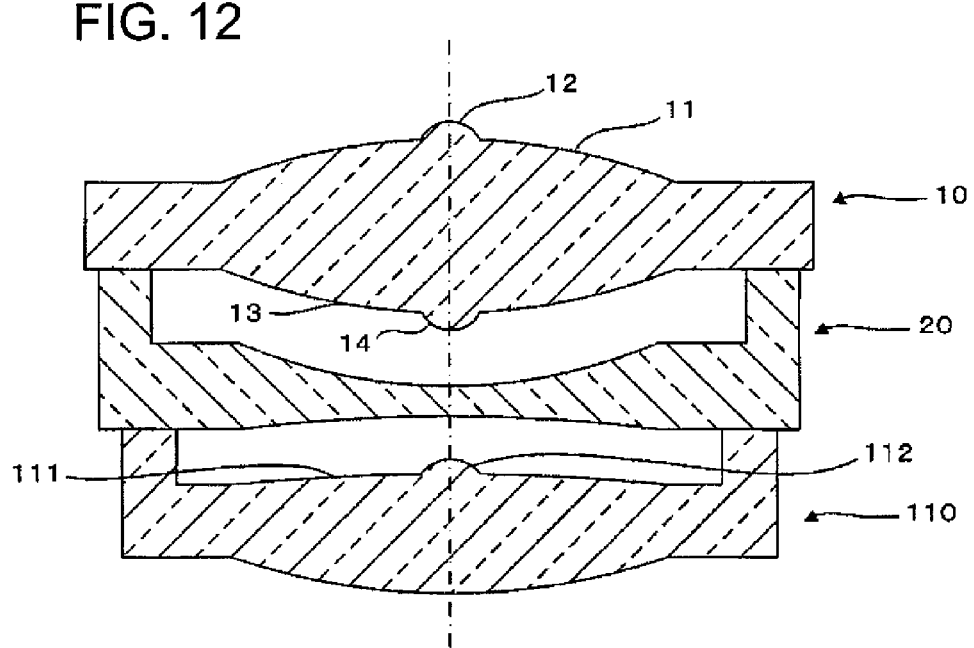
FIG. 12 shows a section view of lenses relating to variant example 5.

Next, the lens relating to variant example 5 is described referring to FIG. 12. FIG. 12 shows a section view of the lenses relating to variant example 5. In the above described lens assembly relating to the third embodiment, the marks are provided on both side surfaces of the second lens 20 provided between the first lens 10 and the third lens 110. As the variant example, the mark is not necessarily provided on the second lens 20.

As shown in FIG. 12 for example, the first lens 10 is provided with marks on both side surfaces, and the third lens 110 is provided with a mark on one side. While, the second lens 20 is not provided with any mark. In this case, since the second lens 20 is not required of very high accuracy position alignment, the shift alignment and the tilt alignment are executed with respect to the first lens 10 and the third lens 110, after disposing the second lens 20 on the third lens 110. Namely, the first lens 10 is moved in parallel direction so that the position of the fifth mark 112 provided on the third lens 110 and the position of the second mark 14 provided on the second surface 13 of the first lens 10 match with each other (shift alignment). Then, while keeping the state that the position of the second mark 14 and the position of the fifth mark 112 are matched, tilt of the first lens 10 is adjusted so that the position of the first mark 12 provided on the first surface 11 of the first lens 10 and the position of the fifth mark 112 match with each other (tilt alignment). As the result, by executing the shift alignment and the tilt alignment with respect to the first lens 10 and the third lens 110, the tilt between the first lens 10 and the third lens 110 is enabled to be suppressed.

Variant Example 6

Figure 13:
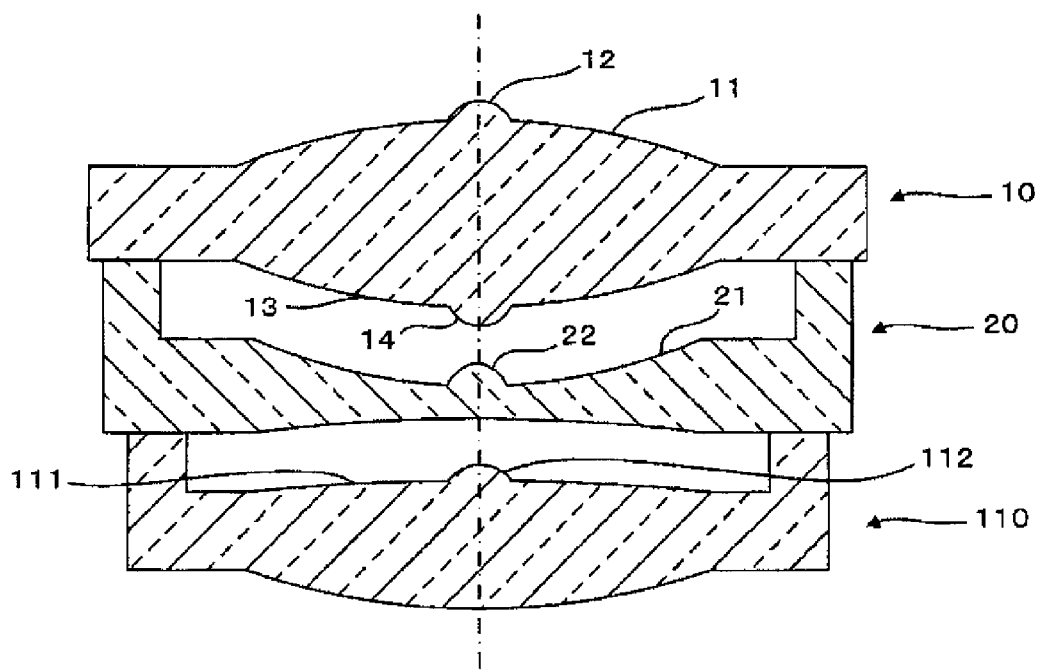
FIG. 13 shows a section view of lenses relating to variant example 6.
Figure 14A:
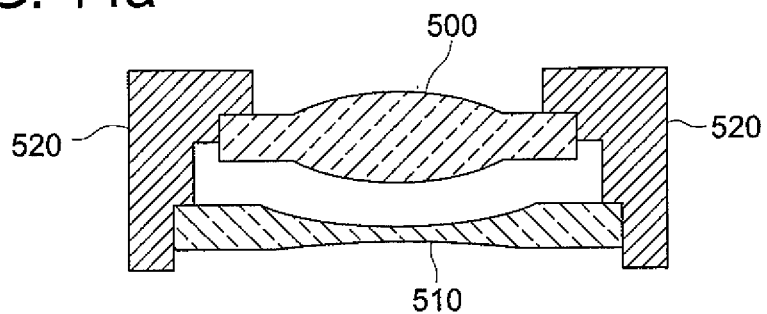
FIGS. 14a-14d show lens section views illustrating an assembling method of the lens relating to a conventional method.
Figure 14B:
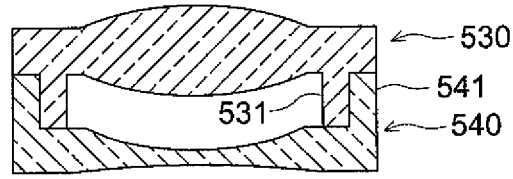
Figure 14C:
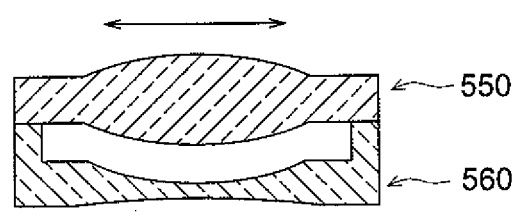
Figure 14D:
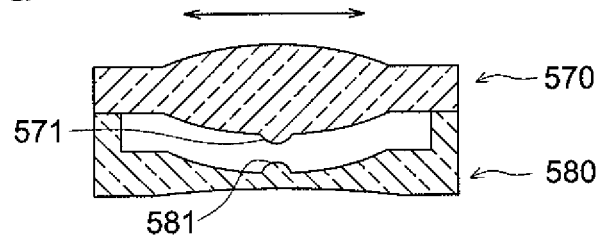

Next, the lens relating to variant example 6 is described referring to FIG. 13. FIG. 13 shows a section view of the lenses relating to variant example 6. As the variant example relating to the lens assembly relating to the third embodiment, the third mark 22 may be provided only on the first surface 21 of the second lens 20.

As shown in FIG. 13 for example, the first lens 10 is provided with marks on both side surfaces, the second lens 20 is provided with a mark on the first surface 21, and the third lens 110 is provided with the fifth mark 112 on the first surface 111. In this case, after disposing the second lens 20 on the third lens 110, the second lens 20 is moved in parallel direction so that the position of the fifth mark 112 provided on the third lens 110 and the position of the third mark 22 provided on the second lens 20 match with each other (shift alignment). Next, the first lens 10 is moved in parallel direction so that the position of the fifth mark 112 provided on the third lens 110 and the position of the second mark 14 provided on the second surface 13 of the first lens 10 match with each other (shift alignment). Then, while keeping the state that the position of the second mark 14 and the position of the fifth mark 112 are matched, the tilt of the first lens 10 is adjusted so that the position of the first mark 12 provided on the first 11 of the first lens 10 and the position of the fifth mark 112 match with each other (tilt alignment). In this way, the tilt between the first lens 10 and the third lens 110 is enabled to be suppressed.

As described above, even in cases of assembling three or more lenses, by executing the alignment with providing marks on both sides of any one lens, the tilt between lenses can be suppressed to enable the production of high precision lens units.

EXPLANATION OF CODES

10, 40, 60, 70: first lens
12, 42a, 42b, 42c, 62, 72a, 72b, 72c: first mark
14, 45, 64a, 64b, 64c, 75a, 75b, 75c: second mark
20, 30, 80: second lens
22, 82a, 82b, 82c: third mark
24: fourth mark
41; 44a, 61a, 63; 71; 74; 81a: effective optical surface
41b, 44b, 61b, 63b, 71b, 74b, 81b: outer peripheral area
43: virtual mark
110: third lens
112: fifth lens

What is claimed is:

1. A lens assembling method for assembling a first lens and a second lens where the first lens has a first mark on a first surface thereof and a second mark on a second surface opposite to the first surface, and the second lens has a third mark on a first surface thereof, the lens assembling method comprising:
    a first step of aligning a position of one of the first mark and second marks of the first lens with a position of the third mark of the second lens; and
    a second step of aligning a position of the other one of the first and second marks of the first lens with the position of the third mark of the second lens, while keeping the position alignment performed in the first step.

2. The lens assembling method of claim 1, wherein the second mark of the first lens and the third mark of the second lens are provided so as to face each other, and in the first step, the position of the second mark is aligned with the position of the third mark.

3. The lens assembling method of claim 1, wherein the first or second mark which is provided in the effective optical surface of the first lens, is provided on the light axis of the first lens.

4. The lens assembling method of claim 1, wherein the third mark is provided on the light axis of the second lens.

5. The lens assembling method of claim 1, wherein the third mark comprises multiple marks provided in an outer peripheral area on a periphery of effective optical surface of the second lens, wherein
    in the first step or the second step, a positions of a virtual mark, with respect to the third mark, is extrapolated based on the multiple marks of the third mark provided in the outer peripheral area, and the position aligning is executed using the position of the virtual mark as the position of the third mark.

6. The lens assembling method of claim 5, wherein the multiple marks of the third mark are respectively arranged at positions of same distance from an optical axis of the second lens, wherein
    in the first step or the second step, a weighted center position of an area enclosed by the multiple marks of the third mark is extrapolated as a position of a virtual mark of the third mark, and the position aligning is executed using the position of the virtual mark as the position of the third mark.

7. The lens assembling method of claim 1, wherein the third mark is, a circular mark centered with an optical axis of the second lens, provided in an outer peripheral area on an periphery of an effective optical surface of the second lens, wherein
    in the first step or the second step, a weighted center position of an area enclosed by the circular mark of the third mark is extrapolated as a position of a virtual mark of the third mark, and the position aligning is executed using the position of the virtual mark as the position of the third mark.

8. The lens assembling method of claim 1, wherein the first mark and the second mark are respectively provided on an optical axis of the first lens, and the third mark is provided on an optical axis of the second lens.

9. The lens assembling method of claim 1, wherein sizes of the first mark, second mark and the third mark are respectively different from each other.

10. A lens assembling method for assembling a first lens and a second lens where the first lens has a first mark on a first surface thereof and a second mark on a second surface opposite to the first surface, and the second lens has a third mark on a first surface thereof, the lens assembling method comprising:
    a first step of aligning a position of one of the first mark and second marks of the first lens with a position of the third mark of the second lens; and
    a second step of aligning a position of the other one of the first and second marks of the first lens with the position of the third mark of the second lens, while keeping the position alignment performed in the first step,
    wherein at least one of the first step and the second step is a step of extrapolating a first virtual mark or a second virtual mark respectively based on the first mark or the second mark, and aligning a position of the first virtual mark or the second virtual mark with the position of the third mark.

11. The lens assembling method of claim 10, wherein at least one of the first mark and the second mark comprises multiple marks provided in an outer peripheral area on a periphery of effective optical surface of the first lens, wherein in the first step or the second step, with respect to the multiple marks, a position of the virtual mark is extrapolated based on the multiple marks provided in the outer peripheral area, and the position of the virtual mark is aligned with the position of the third mark.

12. The lens assembling method of claim 11, wherein the multiple marks, provided in the outer peripheral area, of the first or the second mark, are respectively provided at a same distance from an optical axis of the first lens, wherein in the first step or the second step, with respect to the multiple marks provided in the outer peripheral area, a weighted center position of an area enclosed by the multiple marks is extrapolated as the virtual mark, and the position of the virtual mark is aligned with the position of the third mark.

13. The lens assembling method of claim 11, wherein positions of the multiple marks of the first mark provided in the outer peripheral area, and positions of the multiple marks of the second mark provided in the outer peripheral area are arranged to be dislocated from each other.

14. The lens assembling method of claim 10, wherein at least one of the first mark and the second mark is a circular mark centered with an optical axis of the first lens, provided in an outer peripheral area on a periphery of effective optical surface of the first lens, wherein in the first step or the second step, with respect to the mark provided in the outer peripheral area, a weighted center position of an area enclosed by the circular mark is extrapolated as the virtual mark, and the extrapolated position of the virtual mark is aligned with the position of the third mark.

15. The lens assembling method of claim 14, wherein the circular mark of the first mark provided in the outer peripheral area and the circular mark of the second mark provided in the outer peripheral area have different diameters from each other.

16. A lens assembly comprising:

a first lens provided with a first mark on a first surface thereof, and a second mark on a second surface opposite to the first surface; and a second lens provided with a third mark, wherein the lens assembly is assembled in conditions that a position of the second mark and a position of the third mark are aligned to be matched with each other, and a position of the first mark and the position of the third mark are aligned to be matched with each other.

17. The lens assembly of claim 16, wherein the second lens is provided with a fourth mark on an opposite side surface to the surface formed with the third mark.

18. An image capturing device comprising:

the lens assembly described in claim 16; and an image capturing sensor, which receives incident light having passed through the first and second lenses, provided at an opposite surface side, with respect to the second lens, to a surface side where the first lens is arranged.

19. An image capturing device comprising:

the lens assembly described in claim 17; and an image capturing sensor, which receives incident light having passed through the first and second lenses, provided at an opposite surface side, with respect to the second lens, to a surface side where the first lens is arranged.

* * * * *